Oct. 1, 1968 G. T. STOUT 3,403,758
DISC ELEMENT CONSTRUCTION FOR DISC BRAKE
Filed July 21, 1966
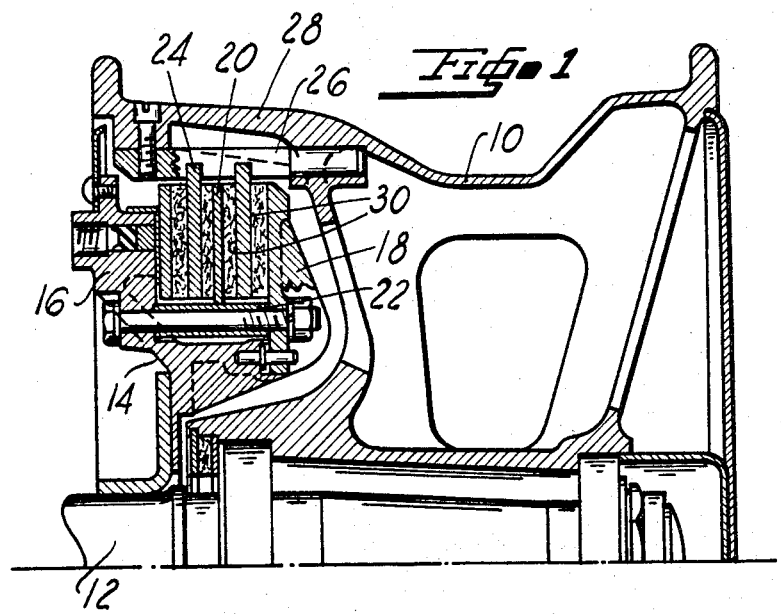
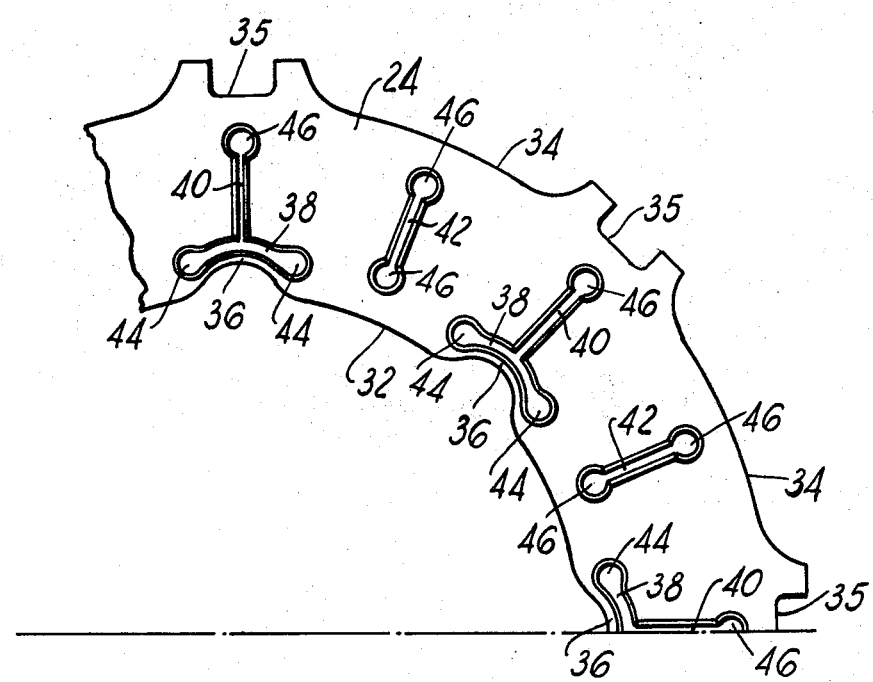
INVENTOR.
GILBERT T. STOUT
BY
William N. Antonis
ATTORNEY United States Patent Office 3,403,758
Patented Oct. 1, 1968

3,403,758
DISC ELEMENT CONSTRUCTION
FOR DISC BRAKE
Gilbert T. Stout, South Bend, Ind., assignor to The Bendix
Corporation, a corporation of Delaware
Filed July 21, 1966, Ser. No. 566,976
7 Claims. (Cl. 188—218)

ABSTRACT OF THE DISCLOSURE

A solid-type friction disc element construction for a disc brake which includes a unique slotted configuration for alleviating the warpage which could occur from non-uniform cooling. The disc element includes spaced-apart radial slots some of which have a compound curved segment located at one end thereof which provides strength to resist out-of-plane warpage, provides flexibility to permit thermal stress relief, and precludes deformation.

---

This invention relates to disc brakes and, more particularly, to a unique construction of a friction disc element for use in such brakes. Although the friction disc element construction is described herein in conjunction with an aircraft wheel and brake, it will be understood by those skilled in the art that this construction may also be utilized in clutch mechanisms or in automobile brakes.

During a brake application, the kinetic energy of the vehicle is transformed into heat energy by the frictional inter-engagement of the rotatable and non-rotatable disc elements of the brake. The heat which is generated in the brake parts and the subsequent non-uniform cooling thereof oftentimes causes sufficient distortion of the brake parts to affect the rate of wear of the lining and reduce or destroy the desired brake running clearance. A "dragging brake" results in excessive over-heating of the brake and rapid wear of the brake lining. All of these factors will of course unduly shorten the usable life of the brake and will tend to increase service expense.

Although segmented friction disc elements have been used satisfactorily in the past to compensate for radial and circumferential expansion therein, it is an object of this invention to provide a uniquely constructed solid-type disc element which can be used satisfactorily in a disc brake. The solid disc element has some advantages over a segmented disc element construction in that it is a one-piece member and, therefore, can be made somewhat more cheaply than the segmented disc element. Furthermore, the solid disc element is not quite as prone to mechanical failure under the influence of forces which are imposed on the disc element as it is accelerated and rotated by the aircraft wheel. Although the solid disc element is not quite as efficient as the segmented rotor in its resistance to distortion, it is sufficiently improved so that the previously mentioned advantages make it desirable from an over-all viewpoint.

When a solid brake rotor is hot, its modulus of elasticity is lowered, its tensible properties likewise are lowered, and it is slightly expanded. Cooling normally occurs in a non-uniform manner. As a rule the outside diameter cools more rapidly. In some arrangements, however, the inside diameter cools more rapidly. In either case, a warpage occurs which reduces or destroys brake running clearance.

Considering first the situation in which a hot rotor cools more rapidly at the inside diameter, it has been found that as cooling progresses radially outwardly across the disc, the material at the outside diameter is in tension and the material at the inner diameter is in compression. After a given number of cycles, the disc will relieve the thermal stress, thus induced, by assuming a cone-like form as its first mode of deformation. If the hot rotor cools more rapidly at the outside diameter, the process is reversed, so that the material at the inside diameter is in tension and the material at the outside diameter is in compression. Such cooling results in a wave washer-like deformation having two humps and two hollows.

Accordingly, it is an object of this invention to provide a solid type friction disc element construction which includes unique means for alleviating the warpage occurring from non-uniform cooling of such elements.

More specifically, it is an object of this invention to provide a solid type friction disc element which includes spaced apart radial slots some of which have a compound curved segment located at one end thereof which not only provides strength to resist warpage out of the plane, but also provides flexibility to permit thermal stress relief and preclude deformations of the type described herein.

The above and other objects and features of the invention will become apparent from the following description taken in connection with the accompanying drawing which forms a part of this disclosure and in which:

FIGURE 1 is a sectional view of one-half of a symmetrical wheel and brake assembly which incorporates the invention; and FIGURE 2 is a side elevation of a portion of the rotor which is removed from the brake assembly of FIGURE 1.

Referring to FIGURE 1, it will be seen that the wheel and brake assembly which is illustrated includes a wheel 10 rotatably mounted on a stationary axle 12, and a stationary carrier member 14 which is connected to the axle by any suitable means. The construction for rotatably mounting the wheel 10 to axle 12 and fixing the stationary carrier 14 to the axle 12 is well known, and a detailed description thereof is not deemed to be necessary. The brake carrier member includes a fluid motor housing 16 at one side thereof and a reaction plate 18 at the other side thereof. Stators 20, suitably lined with friction material, are keyed for axial movement on stator keys 22 which are suitably fixed to the housing 16 and reaction plate 18. Rotors 24 are interleaved with stators 20 and are suitably keyed for axial movement on rotor drive keys 26 which are fastened to the rim 28 of the wheel. Actuation of the fluid motors against the brake stack formed by the relatively rotatable rotors and stators causes movement of the entire brake stack against the reaction plate until the frictional engagement between the elements of the brake stack produces the desired braking action on the aircraft wheel.

Referring to FIGURE 2, which shows the novel construction of each of the rotors 24, it will be seen that each rotor has opposed parallel flat friction surfaces 30 thereon, a radially inner edge 32, and a radially outer edge 34 having key notches 35 for engagement with rotor drive keys 26. In addition, the rotor includes a plurality of spaced apart compound curved segments 36 which are bounded by a plurality of spaced apart arcuate slots 38 and the inner edge 32. A radial slot 40, which is spaced from the inner and outer edges 32 and 34 of the rotor, extends from each of the arcuate slots 38.

The compound curved segments 36 in effect are each comprised of a compound curved section having two inflection points and, therefore, three curves. Because of this compound curvature, the segments 36 will buckle in a spring-like manner when differential expansion of the rotor loads the section either as a column or as an off-set tension member. In order that the compound curved segments 36 will deflect in the desired direction, these segments are designed so that the width thereof is less than the thickness of the disc rotor. The reason for this is that a column in buckling or a beam in bending will deflect in the direction of its lowest section modulus. In other words, a rectangular shaped column will deflect in the direction of its least dimension. Referring to FIGURE 2, the least dimension would be in a radial direction in the plane of the drawing, with this direction being the desirable direction for the deflection to occur. Accordingly, through use of the compound curved segments it is possible to provide strength to resist warpage out of the disc plane and to provide sufficient flexibility to permit thermal stress relief and thereby preclude deformations of the type described herein. It will be understood from the foregoing that the compound curved segments 36 each act as curved beam springs with end loading to allow controlled support and provide flexibility while functioning at a low stress level. The bending stress induced by a change in radius can be computed by the formula:

$$f_b = \frac{t}{2} E \left( \frac{1}{R_2} - \frac{1}{R_1} \right)$$

where:

$f_b$ = the bending stress (p.s.i.)
$t$ = the thickness of the arcuate section (inches)
$E$ = Young's modulus (at temperature)
$R_1$ = free radius of the arcuate section (inches)
$R_2$ = the imposed radius resulting from deflection (inches)

It will be noted from the drawing that at least one radial slot 42 is located between the radial slots 40 extending from the arcuate slots 38. However, more than one radial slot 42 may be utilized if necessary. It will also be noted that the ends 44 of the arcuate slots 38 and the ends 46 of the radial slots 40 and 42 are rounded to eliminate stress concentrations which might tend to crack the rotor. In addition, the edges of the arcuate and radial slots are chamfered so that there are no sharp corners which might score or unduly abrade the engaging friction material lining in the event that the rotor is caused to distort slightly.

From the foregoing, it will be understood that incorporation of the compound curved segments 36 in the friction disc element (a) provides maximum flexibility in a circumferential direction for minimum build-up of thermal stresses initially and relief for those stresses that do occur, (b) supplies rigidity to resist out of flatness deformation, and (c) interferes very little with heat distribution and transfer.

In addition to the above advantages, other advantages may suggest themselves to those who are familiar with the art to which this invention relates Furthermore although this invention has been described in connection with a certain specific embodiment, it will be obvious to those skilled in the art that vavrious changes may be made in the form, structure and arrangement of components without departing from the spirit of the invention. For example, certain reversals in the relationship of the parts may be readily made. Thus, the drive lugs could be moved from the outer edge of the disc to the inner edge of the disc and the compound curved segments could be moved from the inner edge of the disc to the outer edge of the disc. Likewise, if desired, the described construction could be utilized in connection with a stator instead of a rotor.

Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. In a disc brake, a friction disc element having opposed parallel flat friction surfaces formed thereon and continuous radially inner and outer edges, said disc element comprising a plurality of spaced apart compound curved segments bounded by a plurality of spaced apart arcuate slots and one of said edges, said compound curved segments having a width which is less than the thickness of said disc element and having a radius of curvature which differs from the radius of curvature of the edge bounding same, and a plurality of radial slots spaced from said inner and outer edges and extending from said arcuate slots.

2. A friction disc element, as defined in claim 1, wherein said compound curved segments are bounded by said inner edge of said disc element.

3. A friction disc element, as defined in claim 1, wherein at least one radial slot is located between the radial slots extending from said accurate slots.

4. A friction disc element, as defined in claim 3, wherein said arcuate and radial slots terminate in rounded end portions.

5. A friction disc element, as defined in claim 4, wherein the edges of said arcuate and radial slots are chamfered.

6. A friction disc element, as defined in claim 1, wherein said element is a rotor disc and includes drive connecting means formed in one of said edges.

7. A friction disc element, as defined in claim 6, wherein said drive connecting means is formed in said outer edge.

References Cited

UNITED STATES PATENTS

| | | | |
|---|---|---|---|
| 2,905,279 | 9/1959 | Moyer | 188—218 |
| 2,989,161 | 6/1961 | Diebold. | |
| 3,301,356 | 1/1967 | Pompa | 192—107 X |

FOREIGN PATENTS 232,975 9/1944 Switzerland.

MILTON BUCHLER, *Primary Examiner.*

G. E. A. HALVOSA, *Assistant Examiner.*